US008263909B2

(12) United States Patent
Baek et al.

(10) Patent No.: US 8,263,909 B2
(45) Date of Patent: Sep. 11, 2012

(54) COOKING APPARATUS AND HEATER SUPPORTER FOR THE SAME

(75) Inventors: Seung Jo Baek, Gwangmyeong-si (KR); Young Jun Lee, Seoul (KR); Hyoung Jun Kim, Seoul (KR); Byeong Wook Park, Gwangmyeong-si (KR)

(73) Assignee: LG Electronics Inc., Seoul (KR)

(*) Notice: Subject to any disclaimer, the term of this patent is extended or adjusted under 35 U.S.C. 154(b) by 1093 days.

(21) Appl. No.: 11/930,927

(22) Filed: Oct. 31, 2007

(65) Prior Publication Data

US 2008/0184983 A1 Aug. 7, 2008

(30) Foreign Application Priority Data

Feb. 7, 2007 (KR) ........................ 10-2007-0012607

(51) Int. Cl.
*H05B 3/68* (2006.01)
*F16L 3/08* (2006.01)
*H01C 1/01* (2006.01)

(52) U.S. Cl. ................... 219/454.12; 248/74.1; 338/315

(58) Field of Classification Search .... 219/460.1–464.1; 338/285–290, 296–299, 315–319; 248/65, 248/74.1, 74.2, 74.3
See application file for complete search history.

(56) References Cited

U.S. PATENT DOCUMENTS 1,393,368 A 10/1921 Henry
2,262,507 A 11/1941 Lightfoot
2,161,793 A 6/1949 Constant
2,875,313 A 2/1959 King
3,072,775 A 1/1963 Ammerman et al.
3,355,574 A 11/1967 Bassett
3,444,596 A * 5/1969 Soltysik .......................... 248/73
3,560,708 A * 2/1971 Fox ............................... 392/422
4,168,423 A 9/1979 Gilreath
4,296,311 A * 10/1981 Hagglund et al. ......... 219/461.1
4,393,299 A 7/1983 McWilliams
4,645,911 A 2/1987 Husslein
5,780,817 A 7/1998 Eckman et al.
6,161,804 A * 12/2000 Paske et al. ................. 248/74.1
6,603,100 B2 * 8/2003 Wilkins et al. ........... 219/448.19
7,758,197 B2 * 7/2010 Choi et al. .................. 362/97.2

FOREIGN PATENT DOCUMENTS

CN 2207533 Y 9/1995
CN 1510291 7/2004
CN 2699160 Y 5/2005
DE 10 2004 023 847 12/1993
DE 42 42 928 6/1994

(Continued)

OTHER PUBLICATIONS

Korean Office Action for KR Application No. KR 10-2007-0012609 dated Jul. 31, 2008.

(Continued)

*Primary Examiner* — Sang Paik
(74) *Attorney, Agent, or Firm* — KED & Associates, LLP

(57) ABSTRACT

A heater supporter for use in a cooking apparatus is provided. The heater supporter may include a clip portion that receives a heater, an extension portion that supports the clip portion, and a hook portion that couples the heater supporter to an installation plane of the heater. The extension portion may include an elastic portion that elastically supports the clip portion and heater therein, and maintains at least a predetermined distance between the heater and the installation plane. The heater supporter may be formed of a single panel to simplify fabrication and reduce cost.

20 Claims, 12 Drawing Sheets

FOREIGN PATENT DOCUMENTS

| | | |
|---|---|---|
| EP | 0 300 548 | 8/1993 |
| EP | 0 373 706 | 8/1993 |
| EP | 0 556 892 | 8/1993 |
| FR | 248160 | 4/1981 |
| GB | 2 161 348 | 1/1986 |
| KR | 89-18450 | 9/1989 |
| KR | 1020000031770 | 6/2000 |
| KR | 10-2004-0071018 | 8/2004 |
| KR | 10-0518975 | 9/2005 |
| KR | 10-0655907 | 12/2006 |
| WO | WO 96/03610 | 2/1996 |

OTHER PUBLICATIONS

Korean Office Action for KR Application No. KR 10-2007-0012610 dated Jul. 31, 2008.

International Search Report and Written Opinion for PCT Application No. PCT/KR2007/003402 dated Sep. 24, 2008.

U.S. Office Action issued in U.S. Appl. No. 11/779,589 dated Dec. 15, 2009.

Korean Office Action dated Dec. 19, 2007.

European Search Report issued in EP Application No. 07768733.3 dated Feb. 11, 2011.

U.S. Office Action issued in U.S. Appl. No. 11/779,589 dated May 27, 2010.

International Search Report dated Aug. 28, 2008.

Written Opinion of the International Searching Authority dated Aug. 28, 2008.

Korean Office Action issued in KR Application No. 10-2008-0069001 dated Nov. 24, 2011.

Chinese Patent Gazette dated Jul. 27, 2011 issued for CN Application No. 2007-80052047 (now CN 101627260).

* cited by examiner

COOKING APPARATUS AND HEATER SUPPORTER FOR THE SAME

This application claims the benefit of Korean Patent Application No. 10-2007-0012607, filed in Korea on Feb. 7, 2007, the entirety which is incorporated herein by reference.

BACKGROUND

1. Field

This relates to a cooking apparatus, and more particularly, a heater used in a cooking apparatus.

2. Background

Generally, cooking apparatuses include a variety of products, such as, for example, microwave ovens, conventional ovens, cook-tops, and the like. In a microwave oven, microwaves produced by a magnetron are irradiated into a closed cooking chamber, thereby causing vibrations of water molecules in the food to heat the food. A conventional oven uses a heater to heat a closed cooking chamber to heat food received in the cooking chamber. A cook-top typically heats a container disposed on an upper surface thereof using a burner, thereby heating food received in the container.

BRIEF DESCRIPTION OF THE DRAWINGS

The embodiments will be described in detail with reference to the following drawings in which like reference numerals refer to like elements wherein.

DETAILED DESCRIPTION

A cook-top may be used to cook a variety of foods. A burner may be installed in or on the cook-top, and may use an appropriate fuel, such as gas or electricity, as a heating source. An electric cook-top may include a plate on which a container may be disposed, a heater positioned below the plate and operated by electricity, and a base to which the heater is installed. The plate may be made of glass, or other materials as appropriate. The heater may be spaced apart from the base by a predetermined distance so as not to come into direct contact with the base. A heater supporter may be used to support the heater at this predetermined distance from the base.

Figure 1:
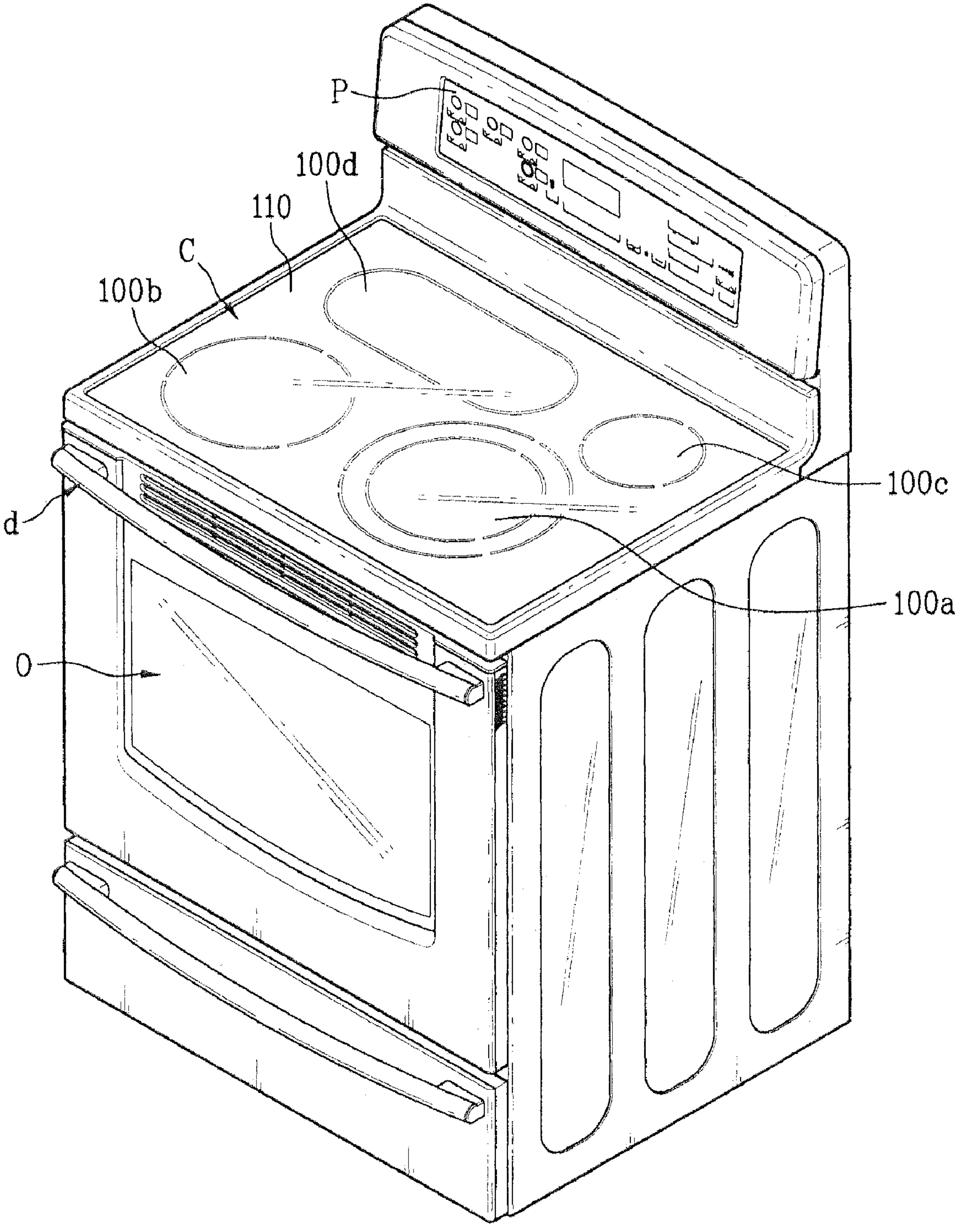
FIG. 1 is a sectional view of an exemplary heater supporter for use in a cooking apparatus.

A cooking apparatus as shown in FIG. 1 may include a cook-top C having a plurality of burners 100*a*, 100*b*, 100*c*, and 100*d*. An oven O may be located below the cook-top C and may be opened or closed by a door d. The oven O may include a magnetron (not shown) for irradiating microwaves into a cooking chamber of the oven O and/or an electrically-operated heater. Operation of the cooking apparatus may be controlled at a control panel P including a controller. The cooking apparatus may be a built-in unit set into a kitchen countertop with or without the oven O. Other installations may also be appropriate. A plate 110 may be provided at an upper surface of the cook-top C. The plate 110 may be made of a ceramic material, such as, for example, glass, and may have a mark, such as an instruction line, for defining an accurate position for placement of cooking containers. The glass plate 110 may be transparent or translucent, and may have an even, flat plane.

The plurality of burners 100*a*, 100*b*, 100*c*, and 100*d* may be located underneath the glass plate 110. The burners 100*a*, 100*b*, 100*c*, and 100*d* may have different sizes and shapes so as to accommodate different sizes and shapes of containers. For example, at least one of the burners 100*d* may have an elongated shape for the efficient heating of an elongated container. Although the burners 100*a*, 100*b*, 100*c*, and 100*d* may have different shapes and sizes, their basic configurations may be substantially the same.

Figure 2:
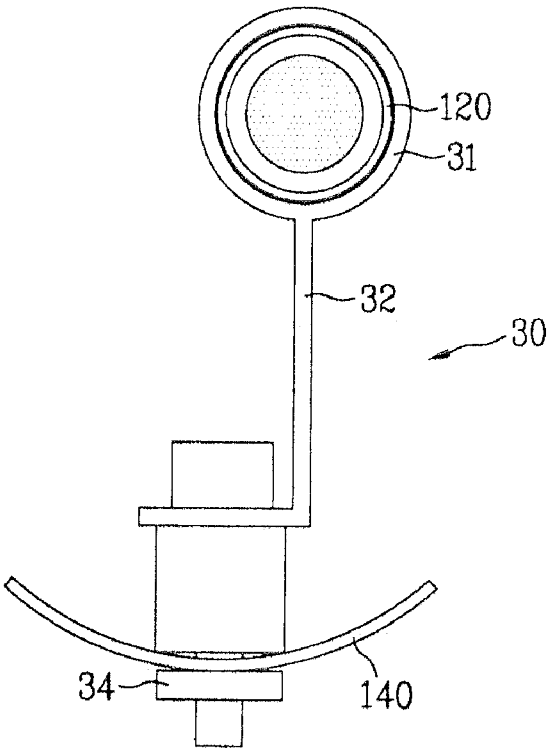
FIG. 2 is a perspective view of a cooking apparatus including a heater and heater supporter as embodied and broadly described herein.

As shown in FIG. 2, a heater supporter 30 may include a grip 31 that surrounds and holds a heater 120, an extension 32 that extends downward from the grip 31, and a bolt 34 that fastens the extension 32 to a base 140 so as to maintain a predetermined distance between the heater 120 and the base 140. However, the grip 31 may surround and come into surface-contact with a heating portion of the heater 120. Therefore, this portion of the grip 31 and/or the heater 120 may undergo a more rapid increase in temperature than the remaining portions thereof, possibly causing oxidization and carbonization of the grip 31, and possible breakage of the grip 31 and/or damage to the heater 120 by overheating. Additionally, the ability of this heater supporter 30 to efficiently prevent a shock applied to the cook-top C from being transmitted to the heater 120 is limited due to its relative rigidity. Moreover, the assembly of the numerous elements of the supporter 30 as described above may degrade productivity during fabrication.

Figure 3:
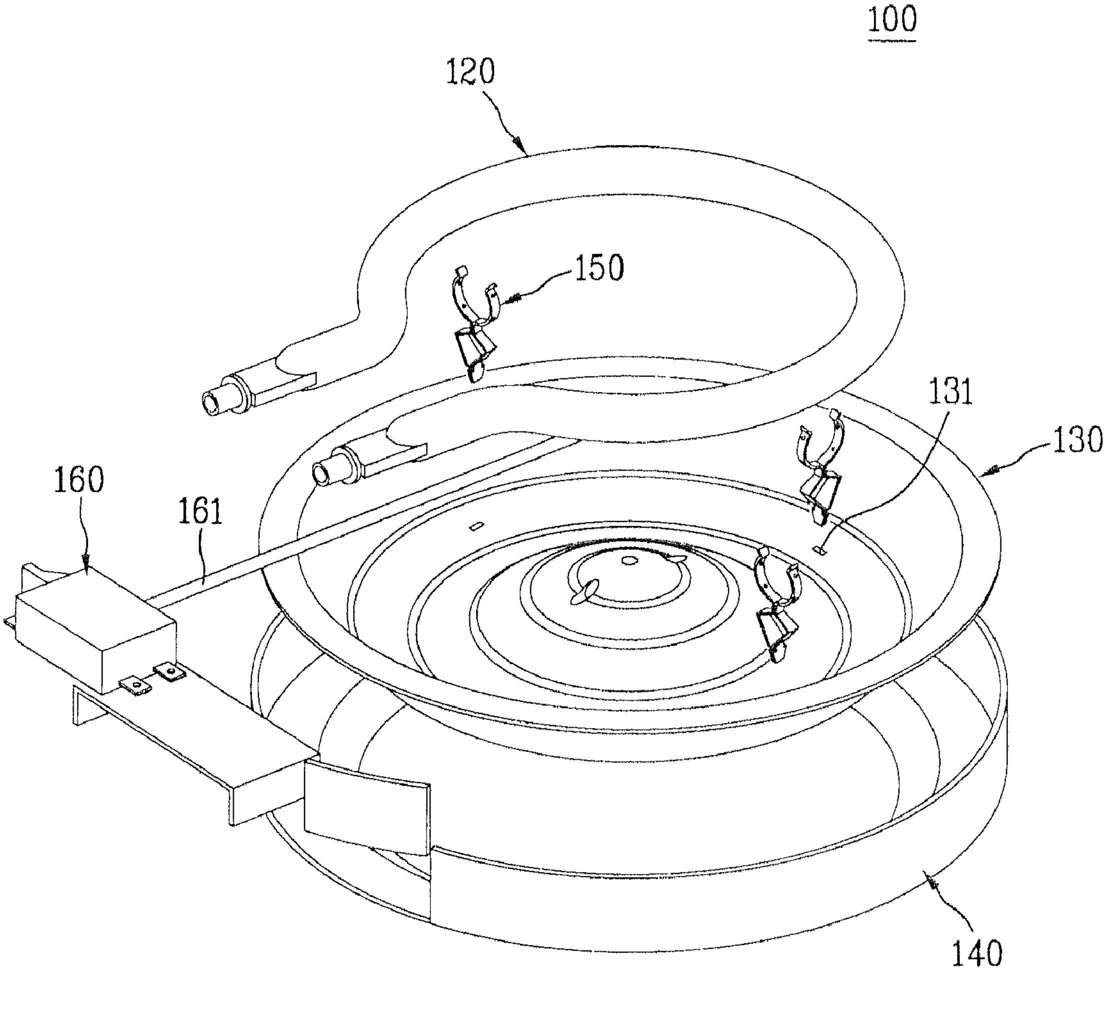
FIG. 3 is an exploded perspective view of a burner included in the cooking apparatus shown in FIG. 2.

FIG. 3 is an exploded perspective view of an exemplary burner in accordance with embodiments as broadly described herein. Hereinafter, for ease of discussion, the above described burners 100*a*, 100*b*, 100*c*, and 100*d* will be commonly referred to as "burner 100". The burner 100 may include a heater 120 that emits heat, and a reflective plate 130 that reflects heat and light emitted by the heater 120 toward the glass plate 110.

The heater 120 may be an electric heater that emits heat using electricity. For example, the heater 120 may be a carbon heater. Other types of heaters may also be appropriate. A carbon heater may include a carbon-made heating resistor located at a center of a sealed quartz tube. Both sealed ends of the quartz tube may be electrically connected to external electrodes by means of connectors, such as metal pieces. The interior of the quartz tube may be kept in a vacuum state or may be filled with inactive gas to prevent the carbon-made heating resistor from being oxidized in the course of emitting high-temperature heat. A heating portion of the heater 120 may be bent to have a circular or horseshoe shape, and may be disposed underneath the glass plate 110.

The reflective plate 130 may surround a periphery of the heater 120 from the lower side of the heater 120 such that the reflective plate 130 reflects the heat and light emitted by the heater 120 toward the glass plate 110. The reflective plate 130 may be made of a material such as, for example, aluminum, and may be subjected to a special process for achieving high heat-resistance and heat reflectivity.

A base plate 140 may be provided underneath the reflective plate 130, surrounding a lower circumferential surface of the reflective plate 130. The base plate 140 may serve as a case for the burner 100, and may also prevent heat from the reflective plate 130 from being transferred to other portions of the cooking apparatus and/or outside of the cooking apparatus.

To allow both ends of the heater 120 to be connected to external electric terminals, both ends of the heater 120 may protrude out of the reflective plate 130 and the base plate 140. A thermostat 160 may be attached to an outer circumferential surface of the base plate 140 to monitor a temperature of the heater 120 and prevent overheating. The thermostat 160 may include an operating bar 161 installed inside the reflective plate 130 and penetrating through the reflective plate 130. Accordingly, if the heater 120 is overheated, the operating bar 161 operates the thermostat 160 to stop the supply of electricity to the heater 120. This may prevent damage to the heater 120 due to overheating.

Figure 4:
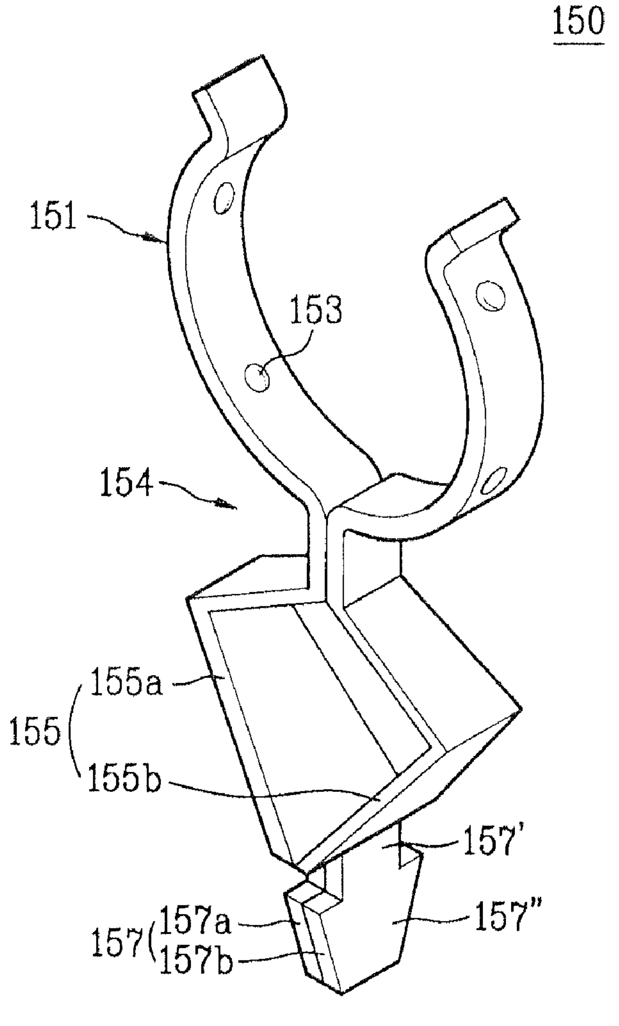
FIG. 4 is a perspective view of a heater supporter included in the burner shown in FIG. 3, in accordance with embodiments as broadly described herein.
Figure 5:
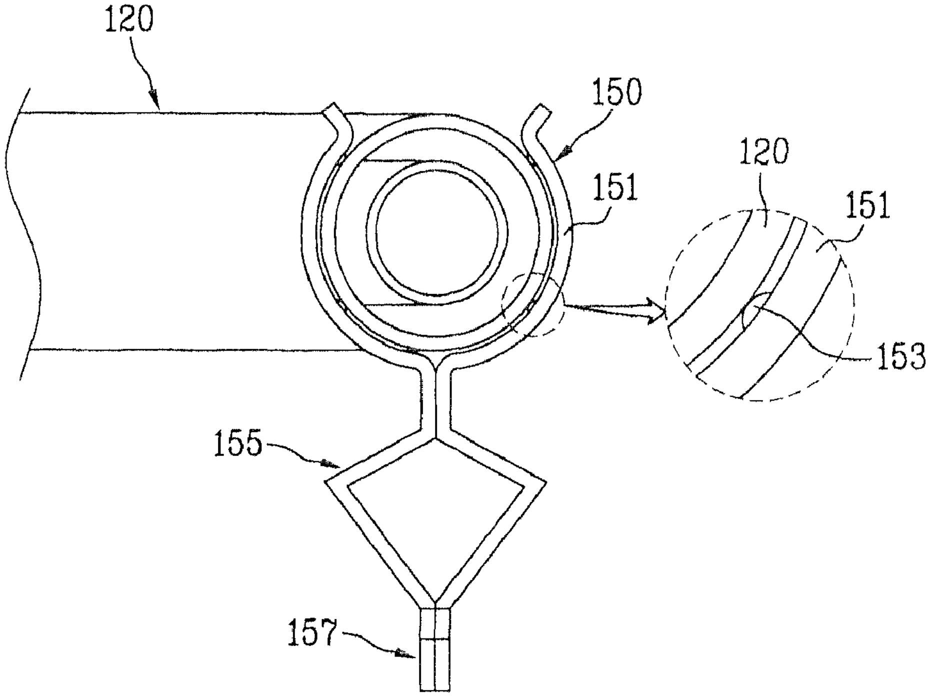
FIG. 5 is a partial sectional view of the heater supporter shown in FIG. 4.

As shown in FIGS. 3 to 5, the burner 100 may include at least one heater supporter 150. The heater supporter 150 may support the heater 120 such that the heater 120 is maintained at at least a predetermined distance from the reflective plate 130. The heater supporter 150 may also prevent the heater 120 from drooping under its own weight.

As shown in FIGS. 4 and 5, the heater supporter 150 may include a clip 151 configured to be coupled to the heater 120 to fix the heater 120 in place, and spacers 153 provided on the clip 151 to space the heater 120 apart from the clip 151 and to define a space between the heater 120 and the clip 151. The clip 151 may be made of an elastic material. The clip 151 may surround at least a part of the periphery of the heater 120. For example, the clip 151, as shown in FIGS. 4 and 5, may have an opened circular shape that has at least one opened portion. The circular shape of the clip 151 may accommodate a generally circular cross section of the heater 120. However, the clip 151 does not necessarily have a circular shape. Other shapes may also be appropriate.

The opened portion of the clip 151 may allow insertion of the heater 120 into the clip 151. The opened portion of the clip 151 may be formed at an upper side of the clip 151, as shown in FIGS. 3-5, or at other locations as appropriate. When the opened part is formed at the upper side of the clip, the clip 151 may surround the lower portion of the heater 120 and consequently, may stably support the heater 120.

To prevent the outer surface of the heater 120 from being scratched by edges of the opened portion of the clip 151 in the course of coupling the heater 120 into the clip 151 and also, to guarantee more smooth insertion of the heater 120, both the edges of the opened portion of the clip 151 may be bent and rounded outwardly. More specifically, when the heater 120 and the clip 151 are coupled to each other, first, the heater 120 is positioned at the opened portion of the clip 151 and is pushed into the clip 151. As the clip 151 is spread, the heater 120 is inserted into the clip 151. As the clip 151 is restored to its original shape due to its elasticity, the coupling of the heater 120 and the clip 151 is completed.

Figure 7A:
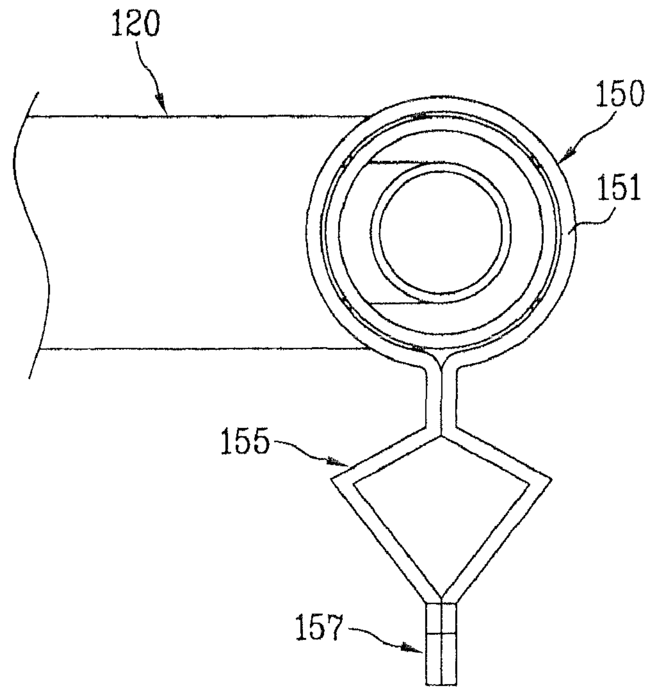
FIGS. 7A-7B, 8, 9A-9B and 10 are perspective views of clips for a heater supporter in accordance with embodiments as broadly described herein.
Figure 7B:
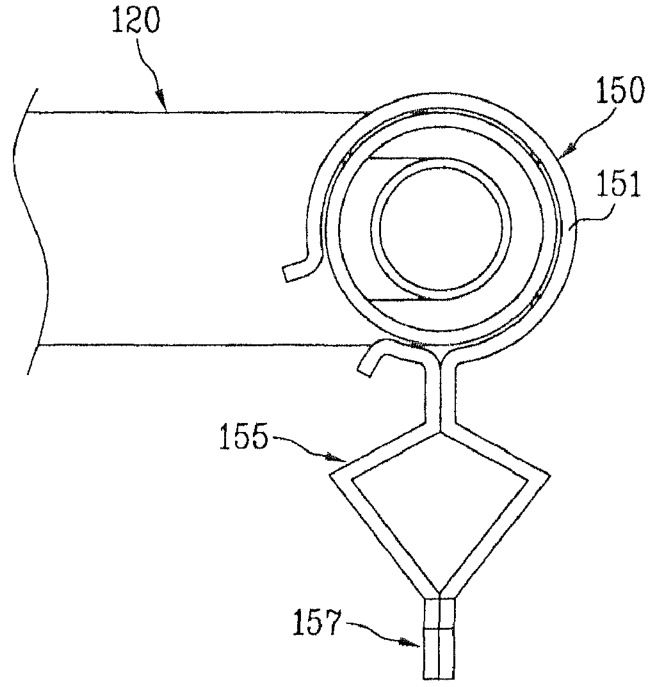

Of course, it will be appreciated that the configuration of the clip 151 is not limited to the above described embodiment as shown in FIGS. 4 and 5. For example, in alternative embodiments, the clip 151 may have a closed circular shape, as shown in FIG. 7A or may have a hook shape such that the heater 120 may be obliquely inserted into the clip 151 from the lateral side or bottom side of the clip 151, as shown in FIG. 7B.

The spacers 153 space the interior surface of the clip 151 apart from the exterior surface of the heater 120 by a predetermined distance to define a space between the clip 151 and the heater 120. The space defined by the spacers 153 allows the heat emitted by the heater 120 to be radiated outward without directly conducting heat to the clip 151 of the heater supporter 150. This consequently has the effect of efficiently preventing the clip 151 from being oxidized and carbonized by high-temperature heat. Also, the heat emitted by the heater 120 can be efficiently discharged to the outside through the space so as to prevent a local contact portion between the clip 151 and the heater 120 from being overheated.

As shown in FIGS. 4 and 5, a plurality of spacers 153 may be arranged along the surface of the clip 151 facing the heater 120. The spacers 153 may include one or more protrusions that protrude from the clip 151 toward the heater 120. The spacers 153 may be formed by an embossing process such that a part of the clip 151 protrudes inward of the clip 151. When forming the protrusions serving as the spacers 153 by an embossing process, the configuration of the heater supporter 150 may be greatly simplified, and the number of constituent elements of the heater supporter 150 may be reduced, resulting in a simplified assembly operation.

Figure 8:
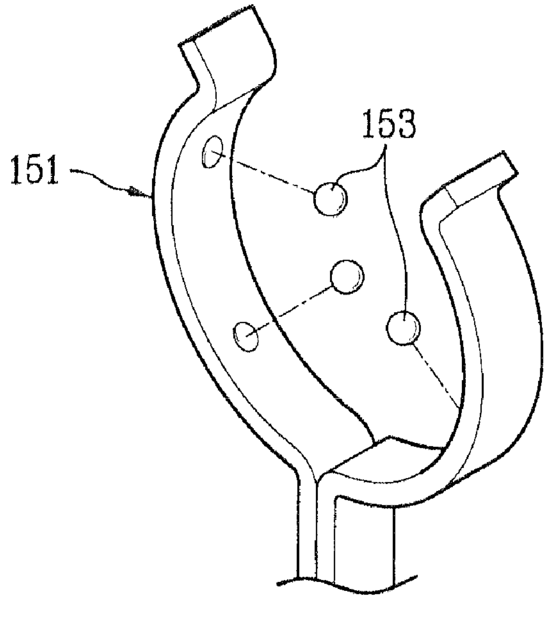

It will be appreciated that the configuration of the spacers 153 are not limited to the above described embodiment. For example, in alternative embodiments, the spacers 153 may be formed separately from the clip 151 and be fitted between the heating portion of the heater 120 and the inner surface of the clip 151, as shown in FIG. 8.

The heater supporter 150 may also include an extended bar 154 extending from the clip 151 such that the clip 151 is spaced apart from the reflective plate 130 to protect the reflective plate 130 and other elements from the very high temperature heat emitted by the heater 120. Thus, the extended bar 154 may be formed at the clip 151 such that it extends toward an installation plane such as, for example, toward the reflective plate 130. In this instance, the installation plane denotes a surface of the constituent element on which the heater 120 is installed. For example, in the embodiment shown in FIG. 3, the installation plane is provided on the reflective plate 130. Of course, if the heater 120 is instead installed, for example, on the glass plate 110, the installation plane may be provided on the glass plate 110.

The extended bar 154 may extend downward from the clip 151, and may have a distal end fixed to the reflective plate 130 to support the clip 151 and the heater 120 coupled thereto. In alternative embodiments, extended bar 154 may be fixed to the glass plate 110 or other element as appropriate to support the clip 151 and the heater 120 coupled thereto.

Figure 6:
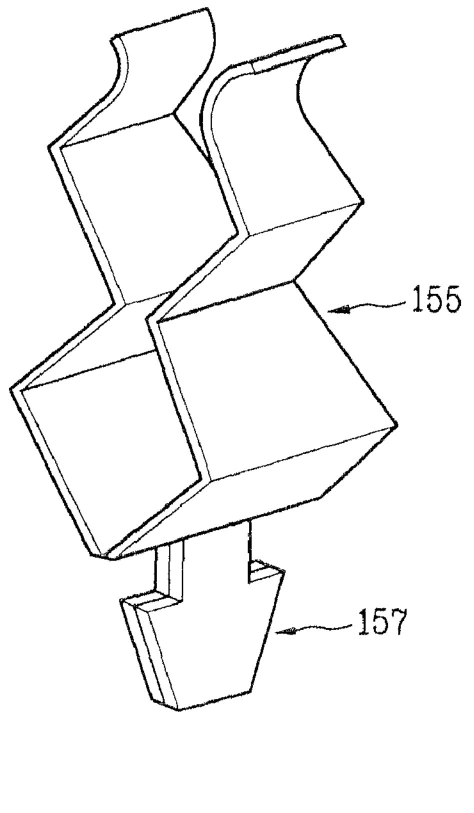
FIG. 6 is a partial perspective view of an elastic portion of the heater supporter shown in FIG. 4.
Figure 9A:
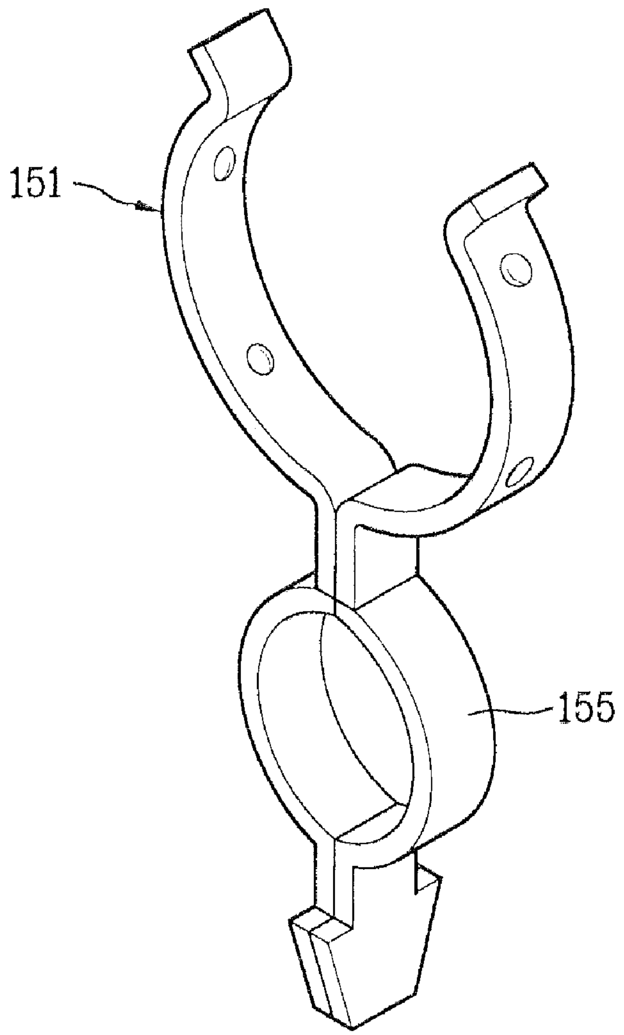
Figure 9B:
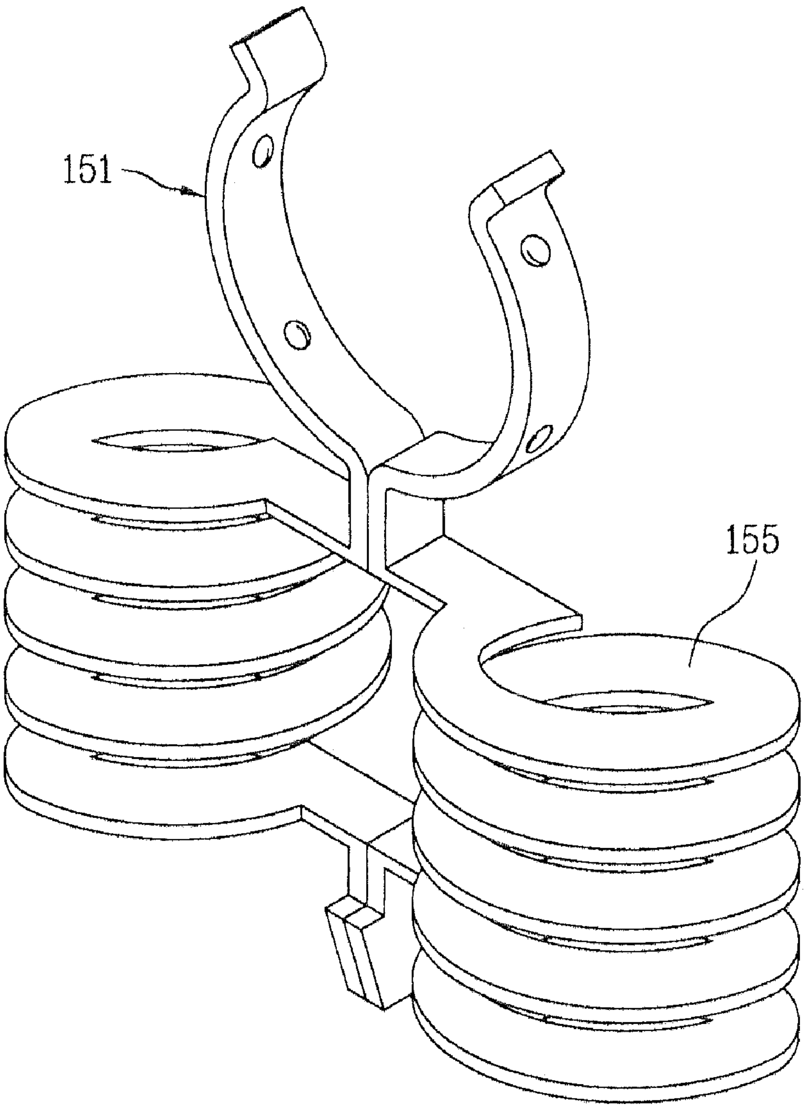

The extended bar 154 may be configured to elastically support the clip 151 so as to prevent a shock applied to a cooking apparatus from being transmitted to the heater 120. To elastically support the clip 151, the extended bar 154 may include an elastic portion 155 having a desired elasticity. For example, the elastic portion 155, as shown in FIG. 4, may be formed by bending a certain portion of the extended bar 154 into a zigzag shape or other shape suitable to achieve elasticity. Of course, the elastic portion 155 may be formed by repeatedly bending the extended bar 154 to have a zigzag shape as shown in FIG. 6. In alternative embodiments, the elastic portion 155 may be formed to have, for example, a circular or helical shape, as shown in FIGS. 9A and 9B.

The elastic portion 155, as shown in FIG. 4, may be integrally formed with the clip 151. Alternatively, the elastic portion 155 may be separately prepared and then fixed to the clip 151.

With a heater supporter 150 that includes an elastic portion 155, even if a shock is applied to the cooking apparatus or burner 100, the elastic portion 155 of the heater supporter 150 can absorb a part of the shock due to its elasticity, thereby minimizing the amount of the shock that is transmitted to the heater 120. Accordingly, there is less risk of damage to the heater 120.

Figure 10:
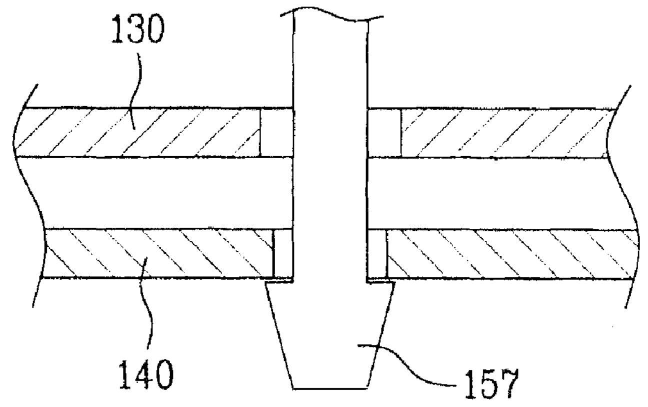

A hook member 157 configured to be coupled to the reflective plate 130 or the base plate 140 may be formed at a distal end of the extended bar. As shown in FIG. 3, the reflective plate 130 may be formed with at least one slot 131 that receives a hook member 157 of the heater supporter 150. In alternative embodiments, the hook member 157 may be fitted into the base plate 140, as shown in FIG. 10, or other portions of the cooking apparatus as appropriate, rather than the reflective plate 130, so as to fix the heater supporter 150 to the cooking apparatus. The hook member 157 may include a small-width neck 157' that extends downward from a lower end of the elastic portion 155, and a wedge 157" formed at a lower end of the neck 157'. The wedge 157" may have a larger width than that of the neck 157', and may be tapered downward.

In alternative embodiments, the heater supporter 150 may be fixed by use of separate elements, such as, for example, screws, etc., rather than a hook member 157. However, using a hook member 157 formed at the distal end of the extended bar 154, the heater supporter 150 can be fixed to a desired element without requiring additional fastening/fixing elements and an additional fastening procedure. Accordingly, an assembling operation can be simplified and manufacturing costs can be reduced.

The above described heater supporter 150 may be formed by cutting a single panel to a desired profile, and then bending and embossing the cut panel such that the clip 151 having the spacers 153, the extended bar 154 having the elastic portion 155, and the hook member 157 are integrally formed.

Figure 11:
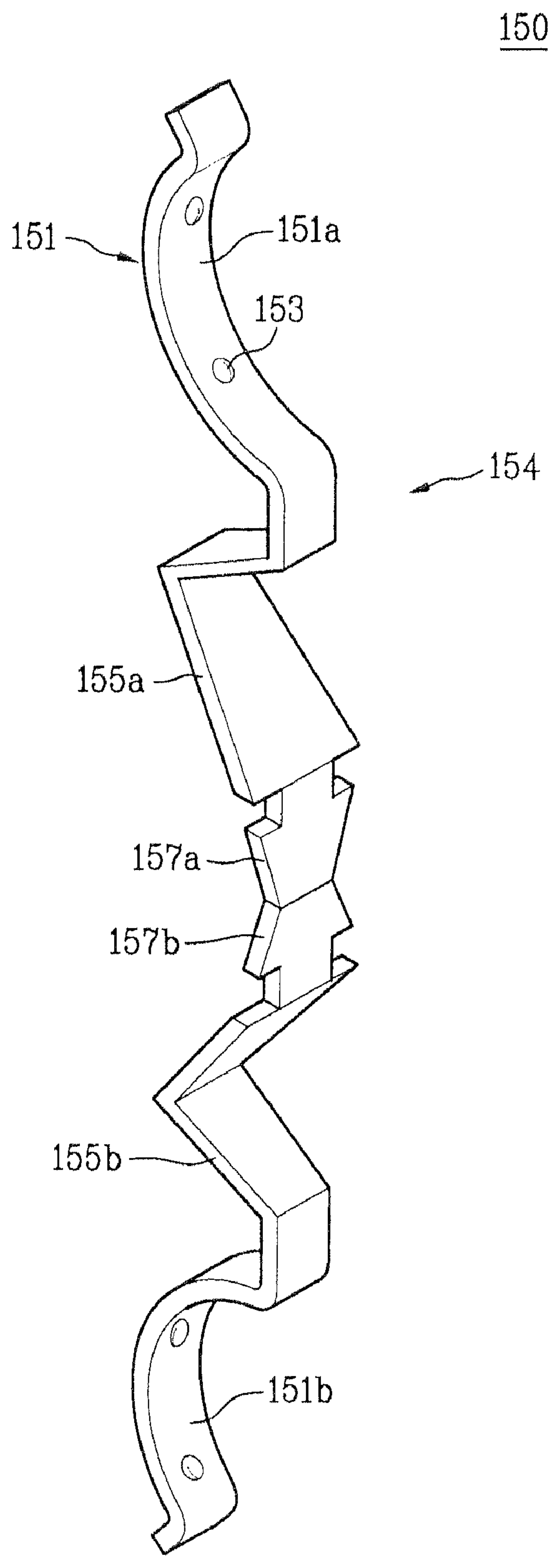
FIG. 11 is a perspective view of a spread state of the heater supporter shown in FIG. 4.

FIG. 11 is a perspective view illustrating a spread state of a heater supporter as embodied and broadly described herein. To form the heater supporter 150, a single panel may be cut along a desired outer contour such that the clip 151, the extended bar 154, and the hook member 157 can be integrally formed. The panel material may be selected from a plurality of different types of materials, including elastic metallic panels and the like.

An end of the cut panel may be bent round to form a first arc **151*a* defining at least a part of the clip 151 to be coupled to the heater 120. The extended bar 154 may be formed at the lower side of the first arc 151*a*. A portion of the extended bar 154 may be formed with a first bent portion 155*a*, which constitutes a portion of the elastic portion 155 as described above. The first bent portion 155*a* may be formed by bending a portion of the extended bar 154**.

A first hook **157*a* may be formed at a lower end of the first bent portion 155*a*. In turn, a second hook 157*b* may extend extended from a lower end of the first hook 157*a* and may have a shape symmetric to that of the first hook 157*a*. As shown in FIG. 6, the second hook 157*b*, which is extended from the first hook 157*a*, may face the first hook 157*a* when the second hook 157*b* is folded about a distal end of the first hook 157*a*. That is, as the second hook 157*b* is folded about the distal end of the first hook 157*a*, the hook member 157** can be completed.

A second bent portion **155*b* may extend from the second hook 157*b*. The second bent portion 155*b* may face the first bent portion 155*a* when the second hook 157*b* is folded toward the first hook 157*a*. Thereby, the second bent portion 155*b* and the first bent portion 155*a* may form the elastic portion 155 of the extended bar 154. In the embodiment shown in FIG. 11, the second bent portion 155*b* has a shape symmetric to that of the first bent portion 155*a*. However, other configurations may also be appropriate, as long as the second bent portion 155*b* can form the elastic portion 155 together with the first bent portion 155*a***.

A second arc **151*b* may extend from an end of the second bent portion 155*b* to complete the clip 151 together with the first arc 151*a*. Assuming that the heater 120 is coupled into the clip 151 and the first arc 151*a* surrounds a part of the periphery of the heater 120, the second arc 151*b* may be configured to surround a part of the remaining periphery of the heater 120**.

In certain embodiments, the clip 151 is partially opened for the access and coupling of the heater 120, and the first arc **151*a* and the second arc 151*b* may be spaced apart from each other by a predetermined distance corresponding to the opened portion of the clip 151** when they are folded toward each other.

Once a metal band, which will form all of the first arc **151*a*, first bent portion 155*a*, first hook 157*a*, second hook 157*b*, second bent portion 155*b*, and second arc 151*b*, is cut from a single panel, a bending process may be performed on required portions of the metal band as described above, so as to form the first arc 151*a*, first bent portion 155*a*, second bent portion 155*b*, and second arc 151*b*. Then, as the second hook 157*b* is folded about the distal end of the first hook 157*a* to face the first hook 157*a*, the heater supporter 150 including the integrally formed clip 151, elastic portion 155, and hook member 157**, can be completed.

If the heater supporter 150 is formed by bending a single elongated metal band as described above, joints of the metal band, for example, joints between the clip 151 and the elastic portion 155, between the elastic portion 155 and the hook member 157, and between the first and second hooks **157*a* and 157*b***, may be subjected to a joining process, such as, for example, welding, so as not to be separated from each other.

Figure 12:
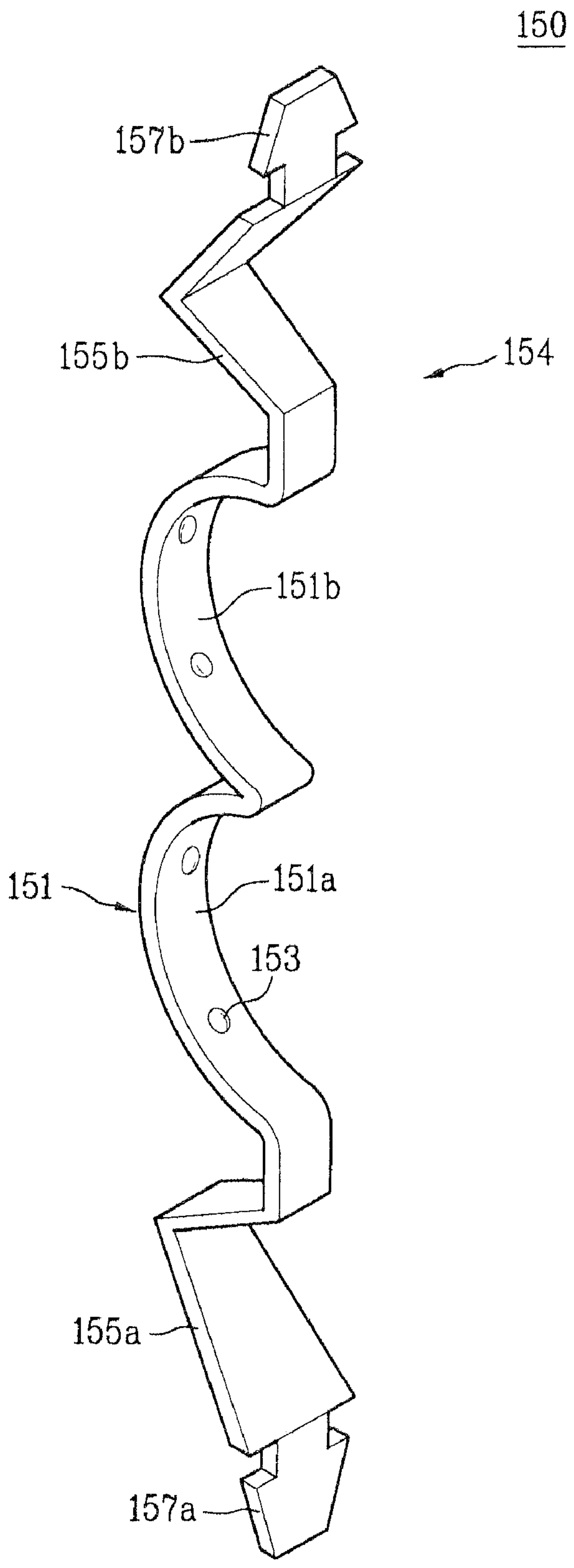
FIG. 12 is a perspective view of a spread state of a heater supporter in accordance with another embodiment as broadly described herein.

In alternative embodiments, the single metal band may be bent at other locations to form the heater supporter 150. For example, as shown in FIG. 12, the first and second hooks **157*a* and 157*b* may be formed at the opposite free ends of the metal band, with the second arc 151*b* extending from the first arc 151*a* at a center of the band. A bending process as described above may be performed on the metal band to form the first arc 151*a*, first bent portion 155*a*, second bent portion 155*b* and second arc 151*b*. Then, as the second arc 151*b* is folded about the distal end of the first arc 151*a* to face the first arc 151*a*, the heater supporter 150 including the integrally formed clip 151, elastic portion 155, and hook member 157** can be completed.

Forming the heater supporter 150 by bending the single metal band has many advantages. For example, the heater supporter 150 may be fabricated with very low costs by simplifying an assembling operation of the heater supporter 150, and consequently achieving low production costs and improved productivity.

The clip 151 and the extended bar 154 may be made of a Kanthal D alloy. The Kanthal D alloy generally has higher heat-resistance than stainless steel or Inconel, and will sustain less damage, even when it is used at a high temperature for a long time.

When a food cooking container is put on the glass plate 110 of the cook-top C and the control panel P is operated, electricity is supplied to the heater 120 of the burner 100. The heater 120 emits heat and light, and the heat and light emitted by the heater 120 are reflected toward the container on the glass plate 110 by the reflective plate 130. As the container is heated, the food received in the container can be heated and cooked.

In a cooking apparatus as embodied and broadly described herein, even if a shock is applied to the cooking apparatus, the elastic portion 155 of the heater supporter 150 absorbs the shock, thereby efficiently preventing the shock from being transmitted to the heater 120. As a result, it is possible to efficiently prevent damage to the heater 120 due to the shock.

In accordance with a cooking apparatus and a heater supporter for the same as embodied and broadly described herein, a space capable of discharging heat emitted by a heater to the outside can be formed by spacers interposed between a clip of the heater supporter and the heater. This may prevent the clip from being broken by oxidization and carbonization, and may prevent the heater from being damaged by local overheating.

By elastically supporting the heater using the heater supporter, transmission of a shock externally applied to the cooking apparatus to the heater may be prevented.

The heater supporter may be fitted into and fixed to a reflective plate using a hook member, without additional fasteners such as screws, bolts, etc. Accordingly, the heater supporter can be assembled in a simplified manner within a reduced time, resulting in improved productivity.

A heater supporter as embodied and broadly described herein may be formed by bending a single metal piece. Consequently, a number of elements of a cooking apparatus may be reduced and may be assembled in a simplified manner, thereby achieving improved productivity and reduced manufacturing costs.

A heater supporter for cooking apparatus having an improved configuration suitable to efficiently prevent the heater supporter and a heater from being damaged by a high-temperature heat are provided.

A heater supporter having an improved configuration suitable to efficiently prevent a heating portion of a heater from being damaged by an external shock applied to a cooking apparatus is provided.

A heater supporter having an improved configuration suitable to reduce an assembling time of the heater supporter, resulting in an improvement in the productivity of a cooking apparatus is provided.

A cooking apparatus as embodied and broadly described herein may include a heater for emitting heat, and a heater supporter including a clip to be coupled to the heater for the fixing of the heater, and a spacer for spacing the heater apart from the clip, to define a space between the clip and the heater.

The clip may be configured to surround at least a part of the heater, and the spacer may be arranged at a surface of the clip facing the heater.

The spacer may include at least one protrusion formed at a surface of the clip, and the protrusion may be integrally formed with the clip by an embossing process.

The clip may fix the heater by elasticity, and the clip may have an opened circular shape having at least one opened portion for receiving the heater inside the clip.

The opened portion of the clip may be configured to be spread outward in a radial direction of the clip.

The heater supporter may also include an extended bar for supporting the heater such that the heater is spaced apart from an installation plane for the heater.

The extended bar may elastically support the heater for reducing a shock applied to the heater, and the extended bar may be configured to extend from the clip toward the installation plane.

The extended bar may have an elastic portion for elastically supporting the clip and the heater, and the elastic portion may be formed by bending at least a part of the extended bar.

A hook member may be formed at a distal end of the extended bar, so as to be inserted into and fixed to the installation plane.

The heater supporter may be made of a Kanthal D alloy.

In accordance with another embodiment as broadly described herein, a heater supporter for a cooking apparatus may include a clip coupled to a heat emitting heater for the fixing of the heater, a spacer formed by performing an embossing process on the clip for defining a space between the clip and the heater, and an extended bar extended from the clip and including an elastic portion for elastically supporting the heater such that the heater is spaced apart from an installation plane for the heater and a hook member to be fixed to the installation plane, the elastic portion and the hook member being integrally formed with each other.

The clip may include a first arc for surrounding a part of the periphery of the heater and a second arc formed by at least a part of a portion extended from the first arc, the second arc being folded to face the first arc, so as to form the clip together with the first arc.

The elastic portion may include a first bent portion formed by at least a part of a portion, extended from the first arc toward the installation plane for the heater, for elastically supporting the first arc, and a second bent portion formed by at least a part of a portion, extended from the first bent portion, for elastically supporting the second arc, the second bent portion being folded to face the first bent portion.

The hook member may include a first hook formed at a distal end of the first bent portion facing the installation plane for the heater, so as to be inserted into and fixed to the installation plane, and a second hook extended from the first hook and folded to face the first hook, so as to form the hook member together with the first hook.

In a cooking apparatus and a heater supporter for the same as embodied and broadly described herein, the space, which can discharge heat, emitted from the heater, to the outside, can be defined between the clip of the heater supporter and the heater by means of the spacers. The provision of the heat emission space has the effect of preventing the clip of the heater supporter from being broken by oxidization and carbonization, or eliminating the risk of damage to the heater by local overheating.

A heater supporter as embodied and broadly described herein can elastically support the heater, so as to efficiently prevent an external shock, applied to the cooking apparatus, from being transmitted to the heater.

A heater supporter as embodied and broadly described herein can be fitted into and fixed to the reflective plate, etc. by use of a hook member integrally formed at the heater supporter, without using separate fastening members such as screws or bolts. Accordingly, the assembling of the heater supporter can be simplified, and less time is required for the assembling of elements of the cooking apparatus. Consequently, the heater supporter has the effect of reducing the number of elements of the cooking apparatus to be assembled, and can contribute to achieve an improved productivity and low manufacturing costs of the cooking apparatus.

A heater supporter as embodied and broadly described herein may be formed by bending a single metal piece.

Thereby, the cooking apparatus, employing the heater supporter, can achieve a remarkable reduction in the number of elements and consequently, a simplified assembling operation. As a result, effort may be saved in the transport and storage of elements and improved productivity and low manufacturing costs of the cooling apparatus may be achieved.

Any reference in this specification to "one embodiment," "an embodiment," "example embodiment," "certain embodiment," "alternative embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A cooking apparatus, comprising:
- a cook-top comprising at least one burner;
- a heater configured to emit heat; and
- a supporter configured to position the heater within the burner, the supporter including:
  - a clip having an open circular shape with an opened portion formed along its periphery to receive the heater into the clip;
  - a spacer provided on the clip and configured to maintain a predetermined space between the clip and the heater; and
  - an extended bar that extends from the clip, wherein the extended bar includes:
    - an extension portion that extends outward from the clip, wherein the extension portion is rigid; and
    - an elastic portion that extends from a distal end of the extension portion and is elastically deformable to elastically support the heater positioned in the clip, wherein the extension portion maintains a predetermined distance between the heater and an installation plane of the heater in the burner.

2. The cooking apparatus of claim 1, wherein the heater is configured to discharge heat to an outside of the clip and the heater through the predetermined space maintained therebetween by the spacer.

3. The cooking apparatus of claim 1, wherein the clip is configured to at least partially surround the heater, and wherein the spacer is provided on a surface of the clip facing the heater.

4. The cooking apparatus of claim 1, wherein the spacer comprises at least one protrusion formed on an inner surface of the clip facing an outer surface of the heater.

5. The cooking apparatus of claim 4, wherein the protrusion is integrally formed with the clip by an embossing process.

6. The cooking apparatus of claim 1, wherein the clip is configured to elastically support the heater within the burner.

7. The cooking apparatus of claim 1, wherein opposite ends of the opened portion of the clip are configured to be spread apart so as to receive the heater within the clip, and to elastically return to an initial position so as to retain the heater within the clip.

8. The cooking apparatus of claim 1, wherein the extended bar elastically supports the heater positioned in the clip so as to at least partially absorb an external shock applied to the heater.

9. The cooking apparatus of claim 1, wherein the elastic portion comprises a bent portion of the extended bar.

10. The cooking apparatus of claim 1, wherein the supporter further comprises a hook member formed at an end of the elastic portion opposite the extension portion, wherein the hook member is configured to be inserted into and fixed to the installation plane so as to position the heater within the burner.

11. A heater supporter for a cooking apparatus, the heater supporter comprising:
- a clip configured to receive a heater, the clip comprising:
  - a first arc; and
  - a second arc facing the first arc, wherein the first and second arcs are configured to at least partially surround an outer periphery of the heater positioned in the clip, and wherein a first end of the second arc is positioned adjacent to a first end of the first arc, and wherein a second end of the second arc is spaced apart from a second end of the first arc so as to form an opening therebetween;
- a spacer provided in the clip and configured to maintain a predetermined space between the clip and the heater received therein;
- an extended bar, comprising:
  - an extension portion having a first end coupled to and extending outward from the clip, wherein the extension portion is rigid and maintains a predetermined distance between the heater and an installation plane of the heater; and
  - an elastic portion having a first end coupled to and extending from a second end of the extension portion is elastically deformable to elastically support the heater in the clip; and
- a hook member extending from a second end of the elastic portion and configured to be fixed to the installation plane of the heater.

12. The heater supporter of claim 11, wherein the elastic portion includes:
- a first bent portion that extends from the first arc toward the installation plane so as to elastically support the first arc; and
- a second bent portion facing the first bent portion, wherein the second bent portion extends from the second arc toward the installation plane so as to elastically support the second arc.

13. The heater supporter of claim 12, wherein the hook member includes:
- a first hook formed at an end of the first bent portion opposite the first arc and extending toward the installation plane; and a second hook facing the first hook, wherein the second hook is formed at an end of the second bent portion opposite the second arc and extending toward the installation plane.

14. The heater supporter of claim 11, wherein the hook member is configured to be coupled to the installation plane so as to position the heater at a predetermined position within a burner of a cooking apparatus.

15. The heater supporter of claim 14, wherein the clip, the extended bar and the hook member are integrally formed.

16. The heater supporter of claim 15, wherein the clip, the extended bar and the hook are formed from a single metal panel, wherein the clip includes first and second arcs, the extended bar includes first and second extension portions and first and second elastic portions, and the hook member includes first and second hooks all formed along the single metal panel.

17. The heater supporter of claim 16, wherein the first and second arcs are fanned at opposite ends of the single metal panel, the first and second extension portions extend from distal ends of the first and second arcs, respectively, the first and second elastic portions extend from distal ends of the first and second extension portions, respectively, and the first and second hooks extend from distal ends of the first and second elastic portions, respectively, with distal ends of the first and second hooks positioned at a center of the single metal panel.

18. The heater supporter of claim 17, wherein the single metal panel is bent at its center, such that the first and second hooks, first and second elastic portions, first and second extension portions, and first and second arcs face each other, respectively, to form the hook member, extension bar and clip, respectively.

19. The heater supporter of claim 16, wherein the first and second hooks are formed at opposite ends of the single metal panel, the first and second elastic portions extend from distal ends of the first and second hooks, respectively, the first and second extension portions extend from distal ends of the first and elastic portions, respectively, and first and second arcs extend from distal ends of the first and second extensions, respectively, with distal ends of the first and second arcs positioned at a center of the single metal panel.

20. The heater supporter of claim 19, wherein the single metal panel is bent at its center, such that the first and second hooks, first and second elastic portions, first and second extension portions, and first and second arcs face each other, respectively, to form the hook member, extension bar and clip, respectively.

* * * * *